(12) United States Patent
Perrot et al.

(10) Patent No.: US 8,578,706 B2
(45) Date of Patent: Nov. 12, 2013

(54) EXHAUST LINE WITH REAGENT INJECTOR

(75) Inventors: Yohann Perrot, Belleville-en-Caux (FR); Frédéric Greber, Ecot (FR)

(73) Assignee: Faurecia Systemes d'Echappement

( * ) Notice: Subject to any disclaimer, the term of this patent is extended or adjusted under 35 U.S.C. 154(b) by 350 days.

(21) Appl. No.: 12/921,838

(22) PCT Filed: Mar. 9, 2009

(86) PCT No.: PCT/FR2009/050379
§ 371 (c)(1),
(2), (4) Date: Dec. 7, 2010

(87) PCT Pub. No.: WO2009/115751
PCT Pub. Date: Sep. 24, 2009

(65) Prior Publication Data
US 2011/0113758 A1      May 19, 2011

(30) Foreign Application Priority Data
Mar. 12, 2008  (FR) ...................................... 08 51591

(51) Int. Cl.
*F01N 3/00*      (2006.01)
(52) U.S. Cl.
USPC ........................................................ 60/295
(58) Field of Classification Search
USPC ........................................................ 60/295
See application file for complete search history.

(56) References Cited

U.S. PATENT DOCUMENTS

2007/0163241 A1 *  7/2007  Meingast et al. ............... 60/286
2007/0245718 A1    10/2007  Cheng et al.

FOREIGN PATENT DOCUMENTS

| DE | 10 2005 061 145 A1 | 6/2007 |
| DE | 102005061145 A1 * | 6/2007 |
| FR | 2 891 305 A1 | 3/2007 |
| JP | 11-166410 A | 6/1999 |
| JP | 2006009793 A * | 1/2006 |

OTHER PUBLICATIONS

English translation of DE 102005061145 A1.*
English translation of JP 2006-9793A.*
International Search Report, dated Sep. 15, 2009, from corresponding PCT application.

* cited by examiner

*Primary Examiner* — Thomas Denion
*Assistant Examiner* — Jason Shanske
(74) *Attorney, Agent, or Firm* — Pamela A. Kachur

(57) ABSTRACT

An exhaust line includes a duct having an injection segment with an inner channel defined by a side wall. The exhaust gas flow includes exhaust gas central streams in a central area of the inner channel and exhaust gas peripheral streams in the vicinity of the side wall. A reagent injector injects a reagent in an injection direction. The duct (3) is conformed so that the exhaust gas central streams flow substantially parallel to the central line of the inner channel. The exhaust line includes an element that imparts, to at least some peripheral streams, a rotary movement through the inner channel; and about a rotation axis that is slightly inclined relative to the injection direction.

13 Claims, 3 Drawing Sheets

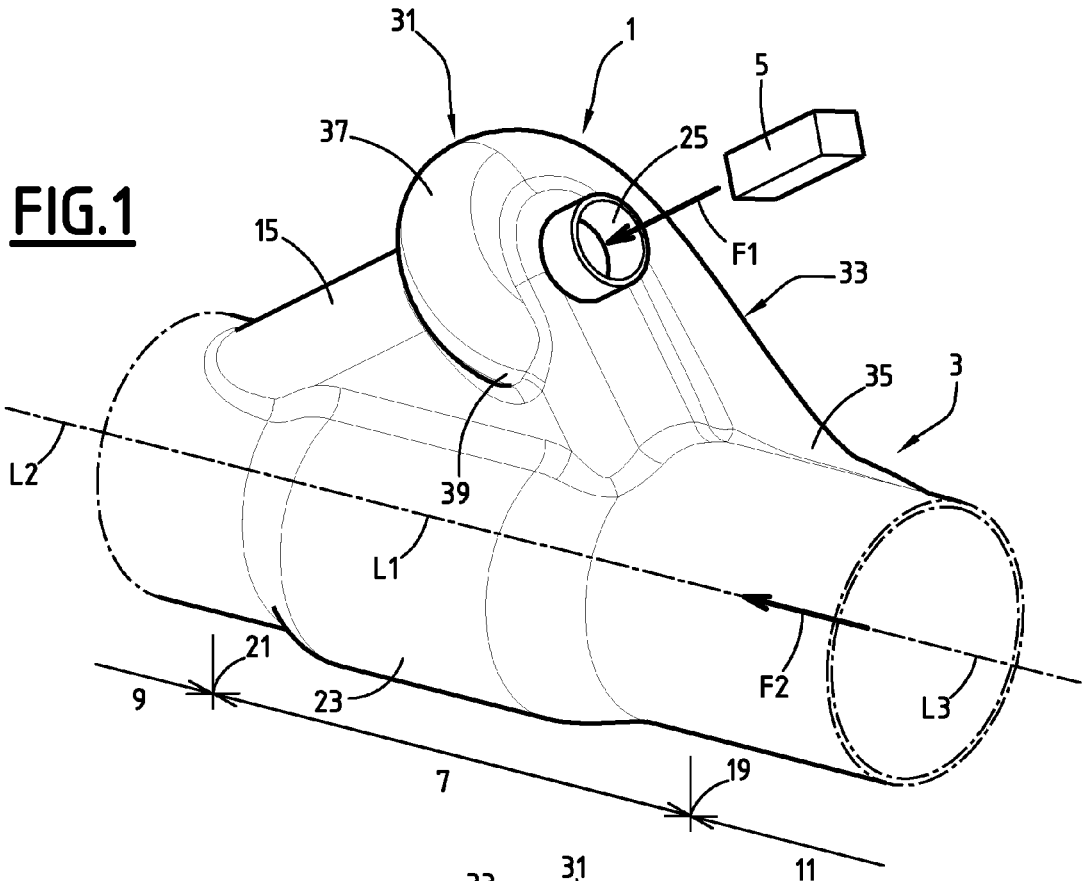
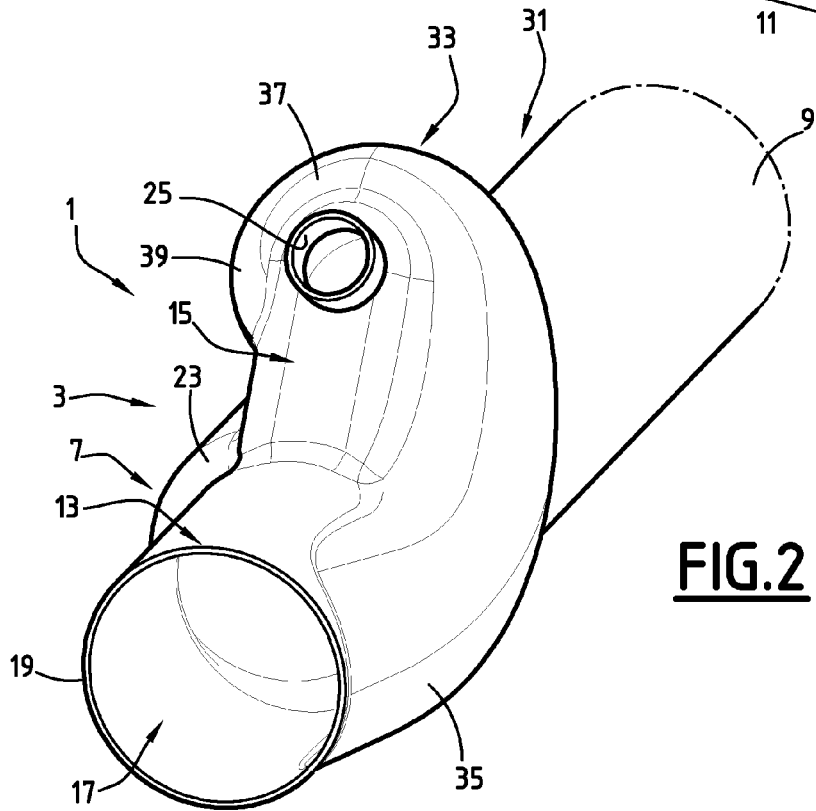

EXHAUST LINE WITH REAGENT INJECTOR

The invention generally concerns automobile exhaust lines equipped with reagent injectors such as for urea.

More specifically, the invention concerns an automobile exhaust line, of the type comprising:
- a duct including an injection segment, the injection segment comprising an inner channel for circulation of an exhaust gas flow defined by a side wall and having upstream and downstream ends, the exhaust gas flows including central exhaust gas streams in a central area of the inner channel and peripheral exhaust gas streams near the side wall;
- a reagent injector, mounted on the injection segment and able to inject a reagent into the inner channel along an injection direction.

Such an injection line is provided to equip an internal combustion engine, for example Diesel. It includes a catalyst provided to carry out the reduction of the nitrogen oxides. The injection point is placed upstream from the catalyst. The injector is provided to inject urea into the exhaust line, the urea consecutively undergoing two chemical reactions, thermolysis and hydrolysis, and transforming into ammonia. Within the catalyst and when the exhaust gas reaches a certain temperature, the ammonia chemically reacts with the nitrogen oxides, reducing them to nitrogen and water.

FR-A-2 891 305 describes an exhaust line whereof the duct includes rectilinear upstream and downstream segments, connected by a helical intermediate segment. It includes an injector whereof the injection direction is substantially combined with the central axis of the downstream segment. The exhaust gas from the helical intermediate portion tangentially penetrates the downstream segment.

Such an arrangement creates a strong back pressure in the exhaust line, which is detrimental to the operation of the engine.

Moreover, the droplets of injected reagent are driven in rotation by the exhaust gas and centrifugated against the walls of the exhaust duct. In certain cases, deposits may be created and cause premature oxidation of the walls of the exhaust duct, which can go as far as perforation.

In this context, the invention aims to propose an exhaust line having a more satisfactory operation.

An exhaust line of the aforementioned type, wherein the inner channel of the injection segment has a central line extending from the upstream end to the downstream end, with the duct being configured such that the central exhaust gas streams circulate from the upstream end to the downstream end of the inner channel substantially parallel to the central line. The exhaust line also comprises an element that imparts to at least certain peripheral streams, a movement through the inner channel rotating around an axis of rotation slightly inclined in relation to the injection axis.

The exhaust line can include one or several of the features below, considered individually or according to all technically possible combinations:
- the injection segment comprises a bulge protruding in relation to the side wall and defining an injection chamber communicating with the inner channel, the bulge having an injection orifice, the injector being able to inject the reagent in the inner channel from the injection orifice along the injection direction.
- the element that imparts to at least certain peripheral streams a rotational movement comprises a volute.
- the volute comprises a helical portion carried by the bulge, with an axis slightly inclined in relation to the injection direction.
- the injection direction and the central line of the inner channel intersect.
- the central line is a straight line.
- the duct comprises an upstream segment and a downstream segment, the upstream and downstream segments respectively comprising upstream and downstream inner channels communicating directly with the upstream and downstream ends of the inner channel of the injection segment, the upstream and downstream inner channels having straight central lines.
- the exhaust line comprises a catalyst for reducing the nitrogen oxides that is placed downstream of the injection segment.

Other features and advantages of the invention will emerge from the detailed description thereof provided below, for information and non-limitingly, in reference to the appended figures, among which:

FIG. 1 is a perspective side view of a duct of the exhaust line provided to receive a reagent injector, the injector being shown symbolically;

FIG. 2 is a perspective view of the duct of FIG. 1, considered in another direction;

Figure 3:
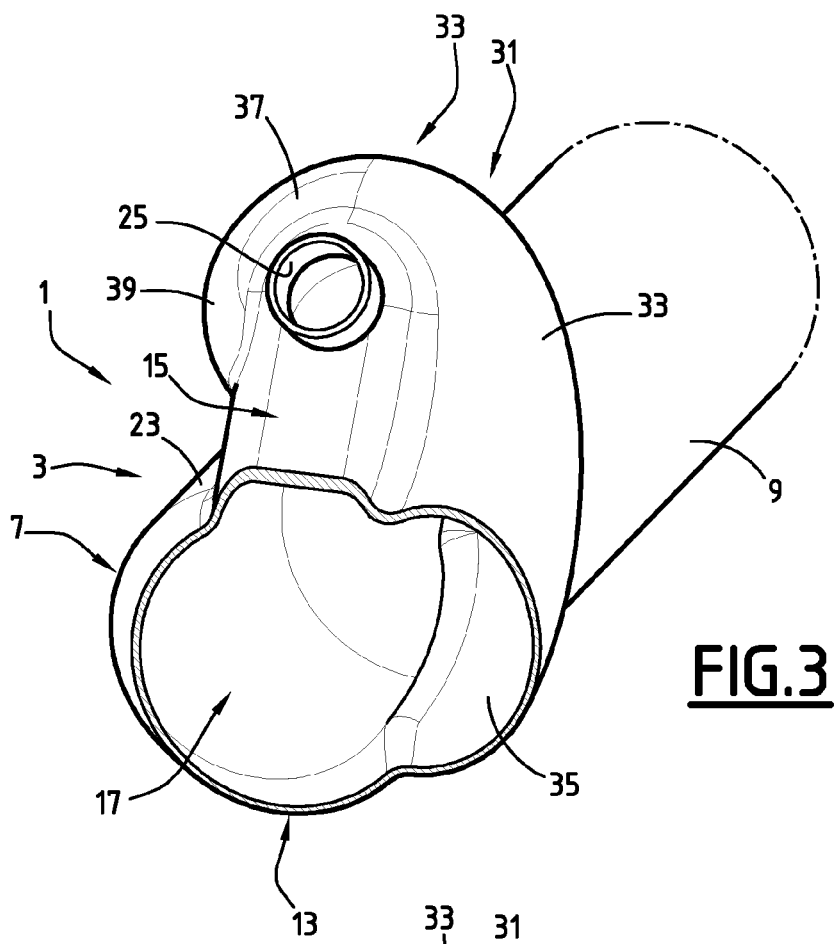
FIG. 3 is a perspective view similar to that of FIG. 2, part of the duct being removed to show the start of the volute making it possible to impart a rotating movement to certain peripheral streams of exhaust gas.
Figure 4:
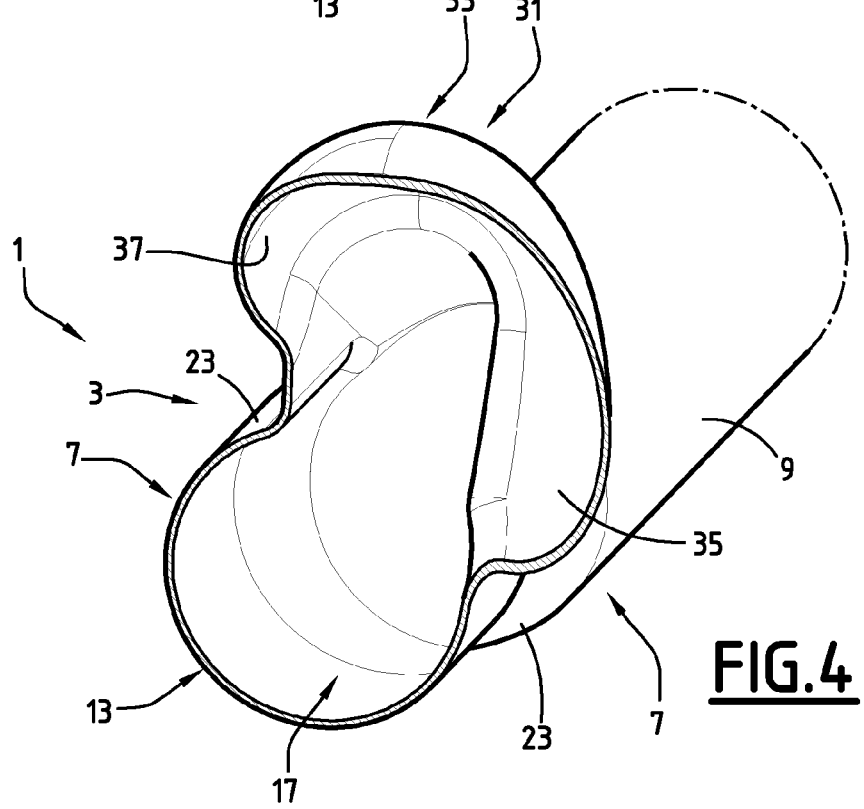
FIG. 4 is a view similar to that of FIG. 2, an additional part of the duct being removed to show the helical portion of the volute.

In the following description, upstream and downstream are understood in relation to the normal circulation direction of the exhaust gas.

The exhaust line 1 partially illustrated in FIG. 1 is provided to be mounted on an automobile equipped with an internal combustion engine, for example Diesel. The exhaust line 1 includes a nitrogen oxide reduction catalyst (not shown), a duct 3 situated upstream of the nitrogen oxide reduction catalyst, and an injector 5 provided to inject a reagent into the duct 3.

The duct 3 includes, among other things, an injection segment 7 on which the injector 5 is mounted, a downstream segment 9 connecting the injection segment 7 to the nitrogen oxide reduction catalyst, and an upstream segment 11 situated immediately upstream of the injection segment 7. The nitrogen oxide reduction catalyst is connected toward the downstream area to a cannula making it possible to release the purified exhaust gas into the atmosphere. The upstream segment 11 is connected upstream to an exhaust manifold, not shown, provided to capture the exhaust gas coming out of the engine's combustion chambers. Other apparatuses, such as a catalytic purification member, or a particle filter, can be inserted between the manifold and the upstream segment of the duct.

The segments 7, 9 and 11 comprise the respective inner channels for circulation of an exhaust gas flow arranged in the extension of one another. The inner channel of the upstream segment 11 is directly connected to the upstream end of the inner channel of the segment 7. The inner channel of the segment 9 is directly connected to a downstream end of the inner channel of the segment 7.

The injector 5 is provided to inject, into the inner channel of the injection segment, a mixture of water and urea in droplet form. The droplets mix with the exhaust gas, vaporizing. The urea undergoes chemical transformations (thermolysis and hydrolysis) in the segment 9, thereby generating ammonia. The ammonia will combine with the nitrogen oxides in the nitrogen oxide reduction catalyst, and forms, by chemical reaction, inert products (nitrogen and water).

As visible in FIG. 2, the injection segment 7 includes a side wall 13 and a bulge 15. The side wall 13 inwardly defines the inner exhaust gas circulation channel 17. It has substantially circular straight sections. The side wall 13 has, near the upstream and downstream ends 19 and 21, a first diameter substantially equal to the diameter of the walls of the upstream and downstream segments. However, the side wall 13 has, in a central area 23 of the inner channel, a second diameter larger than the first.

The bulge 15 protrudes in relation to the side wall 13. It inwardly defines an injection chamber communicating with the inner channel 17 of the injection segment. The communication opening between the injection chamber and the inner chamber is large. It covers the entire imprint of the bulge on the side wall.

The bulge 15 has an injection orifice 25. The injector 5 is mounted on the injection segment 7. It is able to inject the reagent into the inner channel 17 from the injection orifice 25 along an injection direction indicated by the arrow F1 of FIG. 1.

The injection direction is oriented from upstream to downstream and radially from the outside toward the inside of the inner channel.

The inner channel 17 has a central line L1 extending from the upstream end 19 towards the downstream end 21. The line L1 passes through the geometric centers of each of the straight sections of the inner channel. In the embodiment illustrated in FIG. 1, the line L1 is substantially rectilinear. The injection direction F1 and the central line L1 intersect.

The segments 9 and 11 are also cylindrical, at least in the end portions near the injection segment 7, and have, in said portions, respective central lines L2 and L3 that are also rectilinear. The lines L1, L2 and L3 are aligned.

Figure 5:
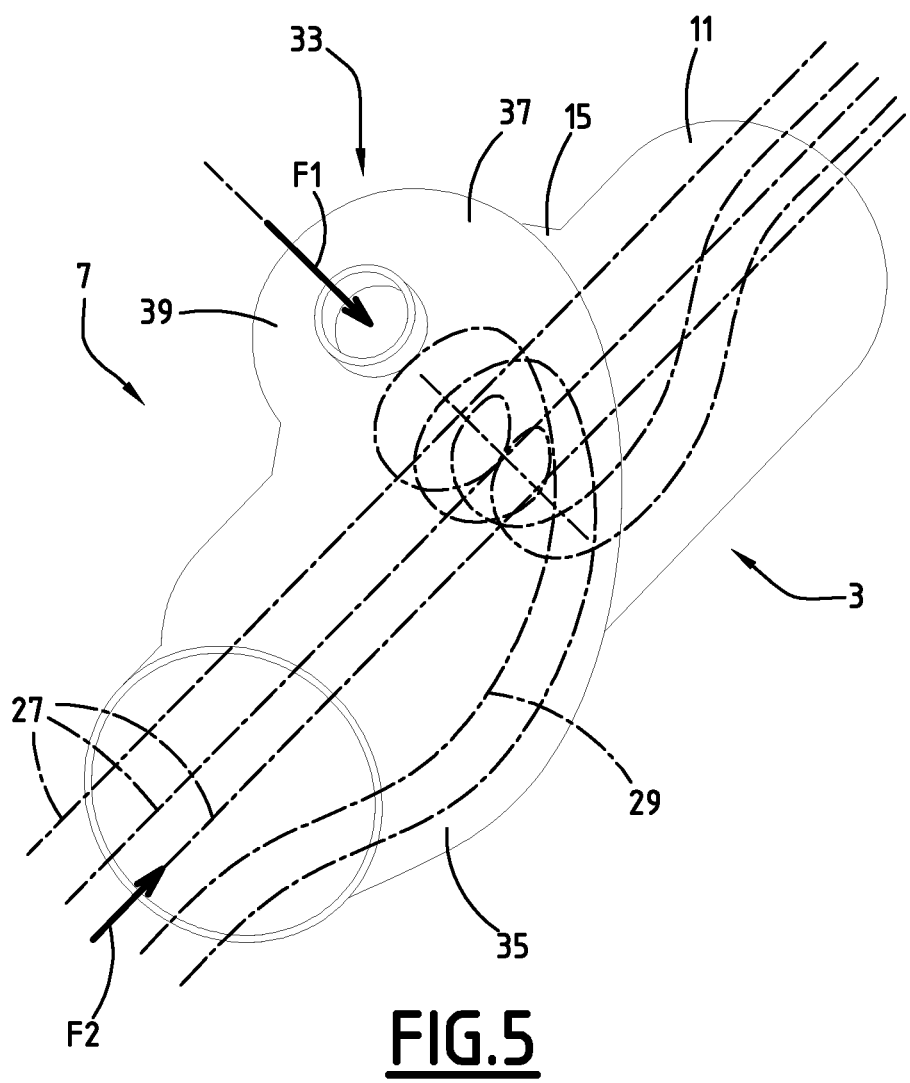
FIG. 5 is a perspective view similar to that of FIG. 2, flow lines showing the path of various exhaust gas streams being superimposed on said figure.

As shown in FIG. 5, the flow of exhaust gas passing through the injection segment includes central streams 27 of exhaust gas in a central area of the inner channel, and peripheral streams 29 near the side wall 13 of the inner channel.

So as to create a rotary movement in the injection chamber, the exhaust line includes an element 31 that imparts, to at least some of the peripheral streams 29, a movement through the inner channel 17 rotating around an axis of rotation that is slightly inclined in relation to the injection axis.

The element 31 includes a volute 33. The volute 33 includes an upstream suction portion 35 carried by the side wall 13, and a helical portion 37 carried by the bulge 15.

The volute 33 is open towards the inner channel or towards the injection chamber over its entire length. The upstream portion 35 protrudes in relation to the side wall 13. Thus, the injection segment 7 has a larger passage section for the exhaust gas at said upstream portion 35 of the volute than at the upstream end 19 or in the upstream segment 11. Because of this, the exhaust gas is suctioned. Due to this suctioning, the gas is accelerated and can follow the volute more easily.

The portion 37 has a helical shape with an axis slightly inclined in relation to the injection direction. Said axis forms an angle smaller than 30° with the injection direction. Preferably, the axis forms an angle smaller than 15° with the injection direction, the axis for example being combined with the injection direction. The portion 37 for example extends over about 270° around its axis.

The portion 37 protrudes in relation to the bulge 15.

The helical portion 37 has a substantially half-disc shaped section. The section of the helical portion narrows from the portion 35 to the end 39 opposite the portion 35.

The operation of the exhaust line described above will now be detailed.

Owing to a nitrogen oxide probe, the control computer for the exhaust line determines the necessary quantity of urea solution, which, once it is transformed into ammonia, will reduce the nitrogen oxides in the dedicated catalyst.

The injector 5 projects, along the injection direction F1, droplets of water and urea mixture. The droplets are projected in a cone from the orifice 25.

The exhaust gas captured by the exhaust manifold is channeled to an upstream segment 11 and penetrates the injection segment through the upstream end 19. At the upstream end 19, all of the exhaust gas streams, both the central streams and the peripheral streams, are parallel to the central lines L1 and L3. Due to the shape of the duct, in particular the shape of the upstream segment and the injection segment, the central streams 27 pass through the injection segment substantially parallel to the central line L1.

As visible in FIG. 5, the central lines 27 are practically not diverted while passing through the injection segment 7.

However, the peripheral streams 29 situated opposite the upstream portion 35 of the volute will be suctioned into the volute 33, as visible in FIG. 5. This effect is more sensitive as the passage section given to the exhaust gas increases at the upstream portion 35. The peripheral streams 29 that circulate opposite other areas of the side wall 13 are not suctioned into the volute 33.

The streams of exhaust gas entering the volute 33 pass through it up to its opposite end 39. These gas streams thus acquire, in addition to their speed component parallel to the central line L1, a rotational speed component around the injection axis. These peripheral streams will therefore follow a helical movement with an axis substantially corresponding to the injection direction or with an axis that is slightly inclined in relation to the injection direction. Slightly inclined here refers to the fact that it forms an angle smaller than 30° in relation to the injection direction.

Thus around the cone of droplets, a gas jacket is created that prevents the liquid droplets from touching the walls of the bulge 15, at least near the injection hole 25. The gas streams suctioned by the volute 33 continuously sweep the area close to the orifice 25 of liquid droplets. They thus prevent liquid from being deposited on the inner walls of the bulge between two successive injections.

Moreover, the helical turbulent movement of the gas streams drives the droplets of injected liquid, in particular the lightest droplets, around the injection direction. The droplets are driven towards the central exhaust gas streams. These central streams circulate parallel to the central line L1 and therefore do not tend to centrifugally project the droplets on the side wall 13 of the injection segment. Moreover, this contributes to improving the mixing between the injected droplets and the exhaust gases.

Furthermore, the helical movement of the peripheral exhaust gas streams around the injection direction prevents the formation of a vortex inside the bulge. Indeed, in the absence of this helical circulation of the peripheral gas streams, a vortex of exhaust gas rotating around an axis perpendicular to the general exhaust gas circulation direction, i.e. the central line L1, may be created in the bulge. This vortex tends to project the liquid droplets on the inner walls of the injection chamber, and to create depositions. Solid amalgams may be created inside the depositions, made up of urea and urea decomposition products, by crystallization. These depositions have a strong adhesion and can over time be detrimental to the proper operation of the injection device.

Moreover, certain urea decomposition products (cyanic or isocyanic acid, ammelide, ammeline . . .) are very acidic and can cause significant corrosion of the walls of the injection chamber.

The exhaust line described above also has other advantages.

The duct can be obtained simply, in particular by molding the injection segment.

It is easy to calibrate the intensity of the helical movement of the gas around the injection direction. To do this, one need only adjust the inner section of the volute in relation to the passage section of the inner channel. Thus, a more or less large proportion of the exhaust gas is captured in the volute. For example, the helical portion 37, at the junction with the upstream portion 35, has a passage section substantially equal to 30% of the straight section of the inner channel.

The exhaust line can have multiple alternatives.

The volute can wind around the injection direction in the clockwise or counterclockwise direction.

The portion 37 of the volute that surrounds the injection direction is not necessarily helical. It can form a spiral around the injection direction. It can also form a circle around the injection direction.

In any case, in the preferred embodiment of the invention, the volute is generally snail-shaped, with an axis that is slightly inclined in relation to the injection direction.

The injector can inject not urea, but any reagent liquid, for example fuel.

The injector 5 can be of any type.

The central lines L1, L2, L3 of the injection segments of the upstream segment of the downstream segment can be aligned as described above. Alternatively, the respective central lines of the upstream and downstream segments can form an angle in relation to each other. Likewise, the central line of the injection segment can form an angle with the central line of the downstream segment and/or with the central line of the upstream segment.

The central line of the injection segment is not necessarily a straight line, but can include one or several slightly curved portions.

The injection segment can include one or several restrictions and one or several flares.

In one non-preferred embodiment, the injection direction does not intersect the central line of the injection segment.

Injection segment here refers to the segment of the duct extending, upstream, to the end of the upstream portion 35 of the volute, and downstream to the downstream end of the bulge.

The invention claimed is:

1. An automobile exhaust line, the exhaust line (1) comprising:
    a duct including an injection segment, the injection segment comprising an inner channel for circulation of an exhaust gas flow defined by a side wall and having upstream and downstream ends, the exhaust gas flow including central exhaust gas streams in a central area of the inner channel and peripheral exhaust gas streams near the side wall;
    a reagent injector mounted on the injection segment to inject a reagent into the inner channel along an injection direction; and
    wherein the inner channel of the injection segment has a central line extending from the upstream end to the downstream end, the duct being configured such that the central exhaust gas streams circulate from the upstream end to the downstream end of the inner channel substantially parallel to the central line, the exhaust line also comprising a volute that imparts, at least to certain peripheral streams, a movement through the inner channel rotating around an axis of rotation forming an angle less than thirty degrees in relation to the injection axis.

2. The exhaust line according to claim 1, wherein the injection segment comprises a bulge protruding in relation to the side wall and defining an injection chamber communicating with the inner channel, the bulge having an injection orifice, the injector injecting the reagent in the inner channel from the injection orifice along the injection direction.

3. The exhaust line according to claim 2, wherein the volute comprises a helical portion carried by the bulge and having a slightly inclined axis in relation to the injection direction.

4. The exhaust line according to claim 3, wherein the axis of the helical portion forms an angle smaller than 30° with the injection direction.

5. The exhaust line according to claim 2, wherein the volute has an upstream portion carried by the side wall, the injection segment having a larger passage section at the upstream portion of the volute than at the upstream end of the inner channel.

6. The exhaust line according to claim 1, wherein the injection direction and the central line of the inner channel intersect.

7. The exhaust line according to claim 1, wherein the central line is a straight line.

8. The exhaust line according to claim 1, wherein the duct comprises an upstream segment and a downstream segment, the upstream and downstream segments respectively comprising upstream and downstream inner channels communicating directly with the upstream and downstream ends of the inner channel of the injection segment, the upstream and downstream inner channels having straight central lines.

9. The exhaust line according to claim 1, including a section configured to receive a nitrogen oxide reduction catalyst placed downstream of the injection segment.

10. The exhaust line according to claim 3, wherein the volute has an upstream portion carried by the side wall, the injection segment having a larger passage section at the upstream portion of the volute than at the upstream end of the inner channel.

11. The exhaust line according to claim 4, wherein the volute has an upstream portion carried by the side wall, the injection segment having a larger passage section at the upstream portion of the volute than at the upstream end of the inner channel.

12. The exhaust line according to claim 3, wherein the helical portion of the volute protrudes toward an outside of the bulge.

13. The exhaust line according to claim 3, wherein the helical portion of the volute defines a recessed conduit having a helical shape and turning around an axis forming an angle of less than thirty degrees relative to the injection direction, the helical portion being open toward the inner channel or the injection chamber.

* * * * *